(12) United States Patent
Barrientos Blanco et al.

(10) Patent No.: US 11,248,664 B2
(45) Date of Patent: Feb. 15, 2022

(54) SYNCHRONIZING RING

(71) Applicant: Ningbo Geely Automobile Research & Development Co., Ltd., Ningbo (CN)

(72) Inventors: Eva Barrientos Blanco, Gothenburg (SE); Henrique Budacs, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/836,601

(22) Filed: Mar. 31, 2020

(65) Prior Publication Data

US 2020/0224734 A1 Jul. 16, 2020

Related U.S. Application Data (63) Continuation of application No. PCT/CN2018/109904, filed on Oct. 11, 2018.

(30) Foreign Application Priority Data

Oct. 17, 2017 (EP) ..................................... 17196927

(51) Int. Cl.
*F16D 23/02* (2006.01)
*F16H 57/04* (2010.01)
*F16D 23/06* (2006.01)

(52) U.S. Cl.
CPC ....... *F16D 23/025* (2013.01); *F16H 57/0478* (2013.01); *F16D 2023/0631* (2013.01); *F16D 2300/06* (2013.01)

(58) Field of Classification Search
CPC .................................................. F16H 57/0478
See application file for complete search history.

(56) References Cited

U.S. PATENT DOCUMENTS

| 5,135,087 A | 8/1992 | Frost | |
|---|---|---|---|
| 2016/0281798 A1 | 9/2016 | Dongaonkar | |
| 2016/0377125 A1* | 12/2016 | Christoffer | F16D 23/025 192/107 M |

(Continued)

FOREIGN PATENT DOCUMENTS

| CN | 105317875 A | 2/2016 |
|---|---|---|
| CN | 106269942 A | 1/2017 |

(Continued)

OTHER PUBLICATIONS

Extended European Search Report from corresponding European Application No. 17196927.2, dated May 7, 2018, 7 pages.

(Continued)

*Primary Examiner* — Timothy Hannon
(74) *Attorney, Agent, or Firm* — Tucker Ellis LLP (57) ABSTRACT

A synchronizing ring for a synchronizer having an inner ring. The synchronizing ring is designed to be arranged outside of and to abut against the inner ring for achieving friction between an outer surface of the inner ring and an inner surface of the synchronizing ring during synchronization. The synchronizing ring has a plurality of through holes extending from the inner surface to an outer surface of the synchronizing ring for evacuation of oil from the interface between the inner ring and the synchronizing ring.

20 Claims, 11 Drawing Sheets

(56) References Cited

U.S. PATENT DOCUMENTS

2018/0274626 A1    9/2018  Komyo

FOREIGN PATENT DOCUMENTS

| CN | 106975547 A | 7/2017 |
| DE | 19719618 A1 | 11/1998 |
| DE | 102007042800 A1 | 3/2009 |
| DE | 102016105090 A1 | 9/2016 |
| EP | 0460513 A1 | 12/1991 |
| WO | 2017094787 A1 | 8/2017 |

OTHER PUBLICATIONS

International Search Report and Written Opinion from corresponding International Patent Application No. PCT/CN2018/109904, dated Dec. 29, 2018, 6 pages.

Communication Pursuant to Article 94(3) EPC from corresponding European Application No. 17196927.2, dated Jul. 26, 2019, 5 pages.

* cited by examiner

SYNCHRONIZING RING

RELATED APPLICATION DATA

This application is a continuation of International Patent Application No. PCT/CN2018/109904, filed Oct. 11, 2018, which claims the benefit of European Patent Application No. 17196927.2, filed Oct. 17, 2017, the disclosures of which are incorporated herein by reference in their entireties.

TECHNICAL FIELD

The invention relates to a synchronizing ring for a synchronizer, and a synchronizer for a vehicle transmission, comprising such a synchronizing ring.

BACKGROUND

Vehicle transmissions usually have synchronizers for shifting gears. For example, an idle gear wheel that is journaled on an output shaft and engaged with a gear wheel arranged on an input shaft, can be connected to the output shaft by a synchronizer. The synchronizer has a sleeve that is brought into engagement with for example a dog ring of the idle gear wheel. The sleeve is connected to a hub by means of a spline joint. The hub is in turn rotationally locked relative to the output shaft. Thus, when the sleeve and the dog ring are engaged, the idle gear wheel and the output shaft are rotationally locked relative to each other by means of the synchronizer and torque can be transferred from the input shaft to the output shaft via the gear wheels.

When shifting gears, before displacement of the sleeve for engaging the dog ring, the rotation speeds of the idle gear wheel and the sleeve have however to be synchronized. For this reason, synchronizing rings or friction rings can be used. The first step of synchronizing the speeds is to increase the friction between the synchronizing rings.

SUMMARY

An objective of the invention is to provide a synchronizing ring enabling an improved synchronization.

The objective is achieved by a synchronizing ring for a synchronizer having an inner ring, wherein the synchronizing ring is designed to be arranged outside of and to abut against the inner ring for achieving friction between an outer surface of the inner ring and an inner surface of the synchronizing ring during synchronization, and the synchronizing ring has a plurality of through holes extending from the inner surface to an outer surface of the synchronizing ring for evacuation of oil from the interface between the inner ring and the synchronizing ring.

The invention is based on the insight that by such a synchronizing ring the oil can be removed very quickly from the friction surfaces via the through holes due to the centrifugal force. The time to reach the maximum friction coefficient can be reduced and the friction coefficient can be kept more constant during the synchronization phase. This in turn will improve the synchronization performance and reduce the shifting time.

According to one embodiment, a longitudinal extension direction of each of said plurality of through holes deviates with an angle $\alpha$, where $0<\alpha<90°$, preferably in the range 5-45°, from a radial direction passing through the centre of the synchronizing ring when looked at the synchronizing ring in a direction in parallel with a longitudinal axis of the synchronizing ring, and preferably the synchronizing ring has an intended rotational direction in operation, and when looked at the synchronizing ring in the direction in parallel with the longitudinal axis of the synchronizing ring, the longitudinal extension direction of each of said plurality of through holes is pivoted with the angle $\alpha$ in the opposite direction to the intended rotational direction relative to the radial direction passing through the centre of the synchronizing ring. Hereby, the evacuation of oil from the friction surfaces can be further improved.

According to another embodiment, the synchronizing ring has a first row of said plurality of through holes arranged along the circumference of the synchronizing ring and a second row of said plurality of through holes arranged along the circumference of the synchronizing ring, and the first row and the second row are arranged spaced apart from each other in a direction in parallel with a longitudinal axis of the synchronizing ring, and preferably said plurality of through holes of the first row and said plurality of through holes of the second row are arranged alternately along the circumference of the synchronizing ring. Hereby, a considerable number of through holes can be arranged in the synchronizing ring while maintaining sufficient strength of the synchronizing ring.

The number of through holes is preferably in the interval 10-100, more preferably 15-60 and often 20-50. The size of each through hole is preferably within the range 0.5-6 mm in diameter, and often 2-4 mm in diameter. The number of through holes and the size of each through hole are to some extent dependent on the size of the synchronizing ring.

According to a further embodiment, the area of the inner surface of the synchronizing ring covered by said plurality of through holes is within the range 3-30%, and preferably 5-15% of the total area of the inner surface of the synchronizing ring. Hereby, an improved evacuation of oil can be achieved at the same time as a sufficient friction surface area can be maintained.

According to another aspect of the invention, a further objective is to provide a synchronizer for a vehicle transmission enabling an improved synchronization.

This objective is achieved by a synchronizer for a vehicle transmission, wherein the synchronizer comprises a synchronizing ring and an inner ring, and the synchronizing ring is arranged outside of and to abut against the inner ring for achieving friction between an outer surface of the inner ring and an inner surface of the synchronizing ring during synchronization, and the synchronizing ring has a plurality of through holes extending from the inner surface to an outer surface of the synchronizing ring for evacuation of oil from the interface between the inner ring and the synchronizing ring.

The advantages of the synchronizer are similar to the advantages already discussed hereinabove with reference to the different embodiments of the synchronizing ring.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
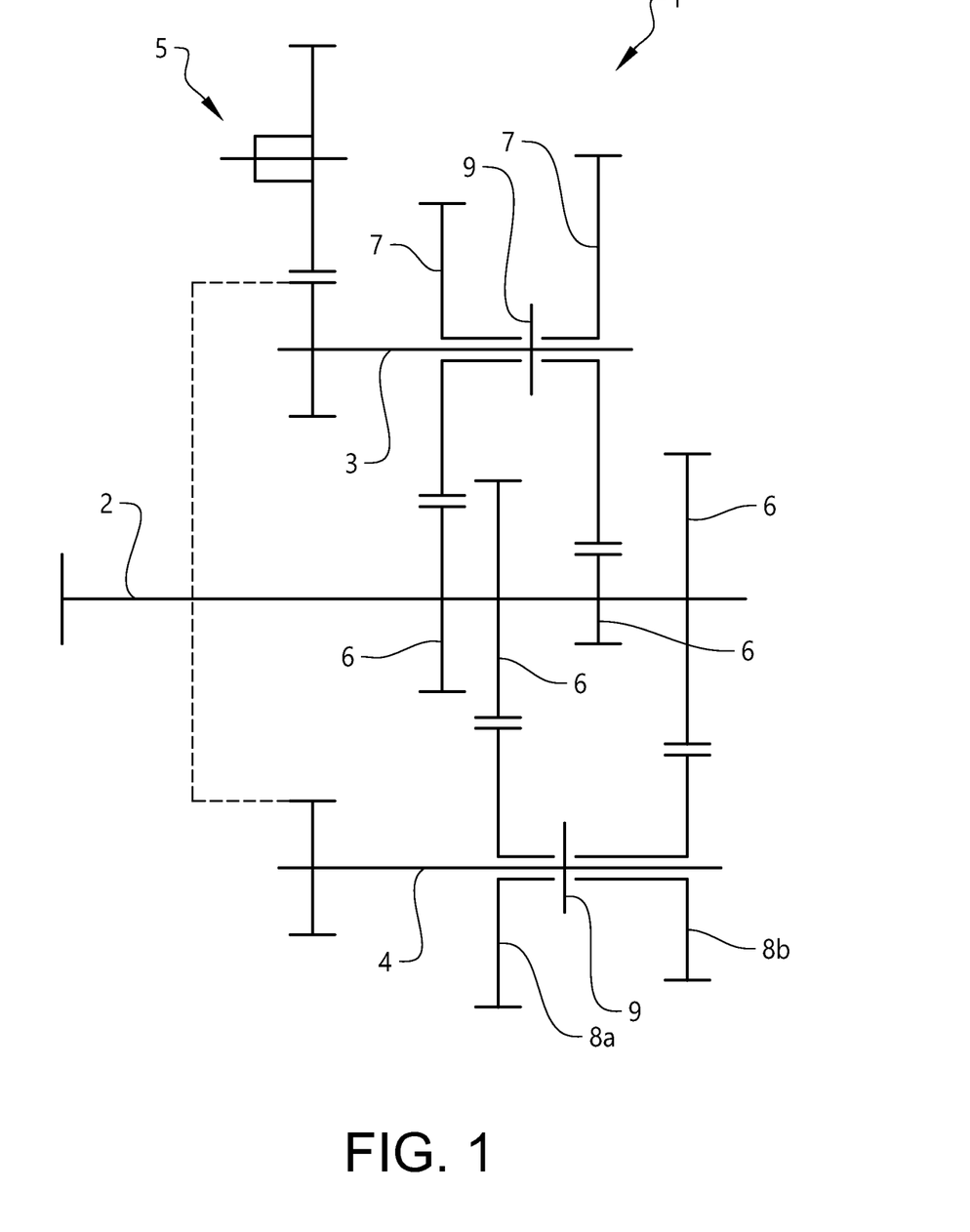
FIG. 1 is a schematic view of a vehicle transmission.

FIG. 1 is a schematic illustration of a vehicle transmission 1. This is an example of a transmission to which the synchronizing ring and the synchronizer according to the invention can be applied. As will be evident from the description herein, the invention can be applied to any transmission having a synchronizer with friction rings for synchronizing a first and a second rotating member relative to each other. Such a synchronizer can be arranged on an output shaft as described hereinafter or be arranged on an input shaft provided with idle gear wheels.

Synchronization is usually performed when shifting gears and a sleeve is to be engaged with a gear wheel for transferring torque from an input shaft to an output shaft (or vice-versa) of the transmission.

The transmission illustrated in FIG. 1 has an input shaft 2 and a first output shaft 3 and a second output shaft 4. The input shaft 2 is driven and can be connected to any kind of motor via a clutch. The first and second output shafts 3, 4 are connected to a differential 5 which in turn is connected to the driven wheels of a vehicle. Gear wheels 6 are arranged on the input shaft 2. Each of the gear wheels 6 is connected to a gear wheel 7 of the first output shaft 3 or a gear wheel 8a, 8b of the second output shaft 4. The output shaft gear wheels 7, 8a, 8b are idle wheels, i.e. each gear wheel is journaled on the respective output shaft and can be rotationally locked to the output shaft by a synchronizer 9.

Figure 2A:
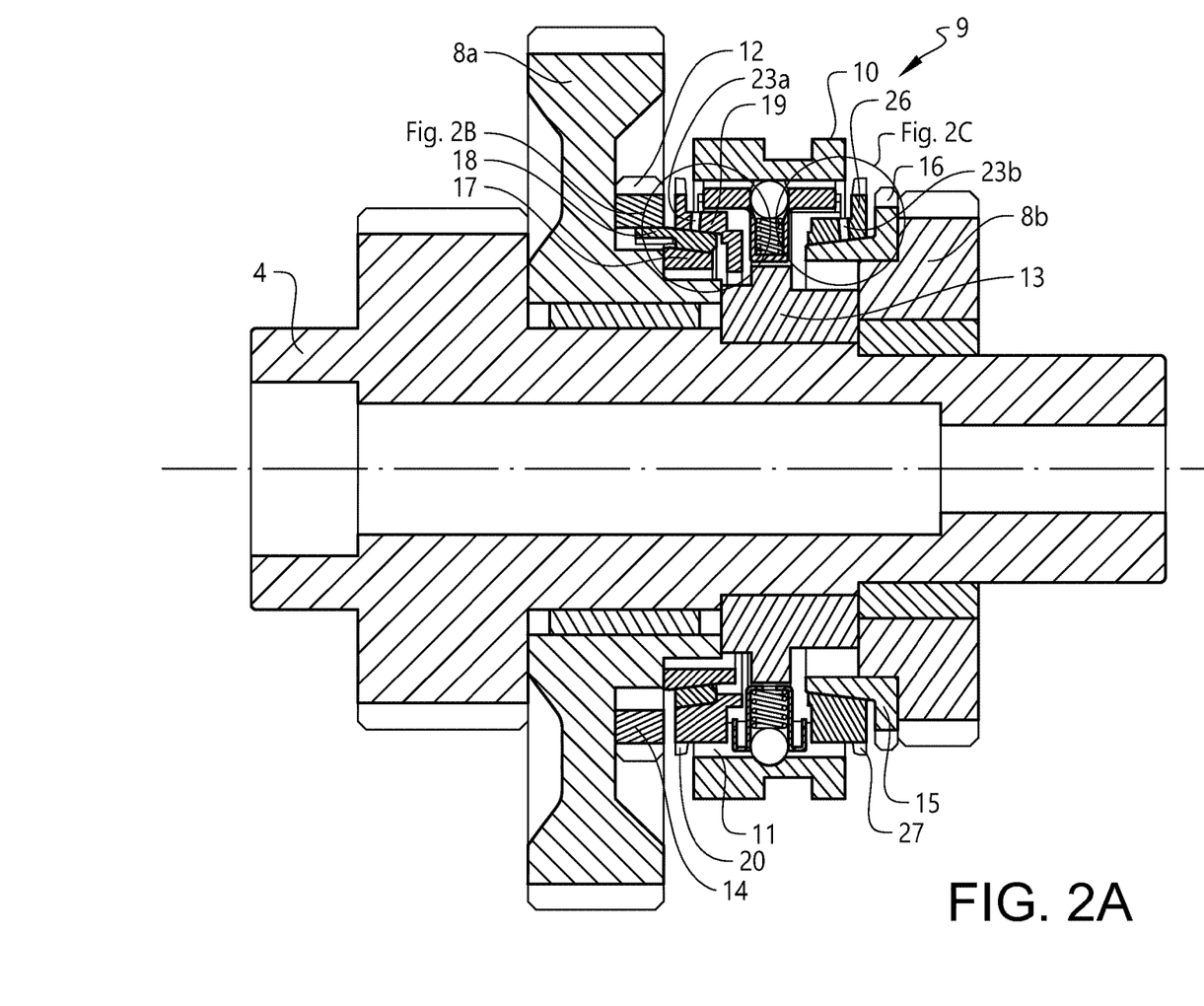
FIG. 2A is a cut view of a synchronizer of a vehicle transmission.

FIG. 2A shows in a cut view an example of such a synchronizer 9. The synchronizer 9 has a sleeve 10 that is displaceable (to the left in FIG. 2A) into engagement with a first idle gear wheel 8a. The sleeve 10 has internal teeth 11 and the first idle gear wheel 8a is provided with a dog ring 14 with corresponding external teeth 12 such that the sleeve 10 and the first idle gear wheel 8a can be rotationally locked to each other. The first idle gear wheel 8a is engaged with another gear wheel (not shown in FIG. 2A) arranged on the input shaft 2. The sleeve 10 is further connected to a hub 13 by means of a spline joint. The hub 13 is in turn rotationally locked relative to the output shaft 4. Thus, when the sleeve 10 and the first idle gear wheel 8a are engaged, the first idle gear wheel 8a and the output shaft 4 are rotationally locked relative to each other via the synchronizer 9 and torque can be transferred from the input shaft 2 to the output shaft 4.

In an analogous way the sleeve 10 is displaceable (to the right in FIG. 2A) into engagement with a second idle gear wheel 8b. The second idle gear wheel 8b is provided with a clutch cone ring 15 having external teeth 16 corresponding to the internal teeth 11 of the sleeve 10 such that the sleeve 10 and the clutch cone ring 15 can be engaged. The clutch cone ring 15 is rotationally locked to the second idle gear wheel 8b. Hereby, the second idle gear wheel 8b and the sleeve 10 can be rotationally locked relative to each other. The second gear wheel 8b is engaged with another gear wheel (not shown in FIG. 2A) arranged on the input shaft. Thus, when the sleeve 10 and the second idle gear wheel 8b are engaged, the second idle gear wheel 8b and the output shaft 4 are rotationally locked relative to each other via the synchronizer 9 and torque can be transferred from the input shaft 2 to the output shaft 4.

For performing the synchronization, the synchronizer 9 comprises friction rings. As regards the synchronization of the first idle gear wheel 8a, the synchronizer has a double cone design. The synchronizer 9 comprises an internal ring 17, an intermediate ring 18 and a first blocking ring 19. These rings are further illustrated in an enlarged view in FIG. 2B.

A blocking ring has teeth for blocking a sliding movement of a synchronizer sleeve arranged externally of the blocking ring. In FIG. 2A, movement of the sleeve 10 is blocked by the first blocking ring 19 when the sleeve 10 is displaced towards the first idle gear wheel 8a. The sleeve 10 is blocked by roof-to-roof contact between the teeth 11 of the sleeve 10 and teeth 20 of the first blocking ring 19 until the rotational speed is synchronized. Thereafter, the sleeve 10 can be further displaced for engagement with the first idle gear wheel 8a.

Figure 2B:
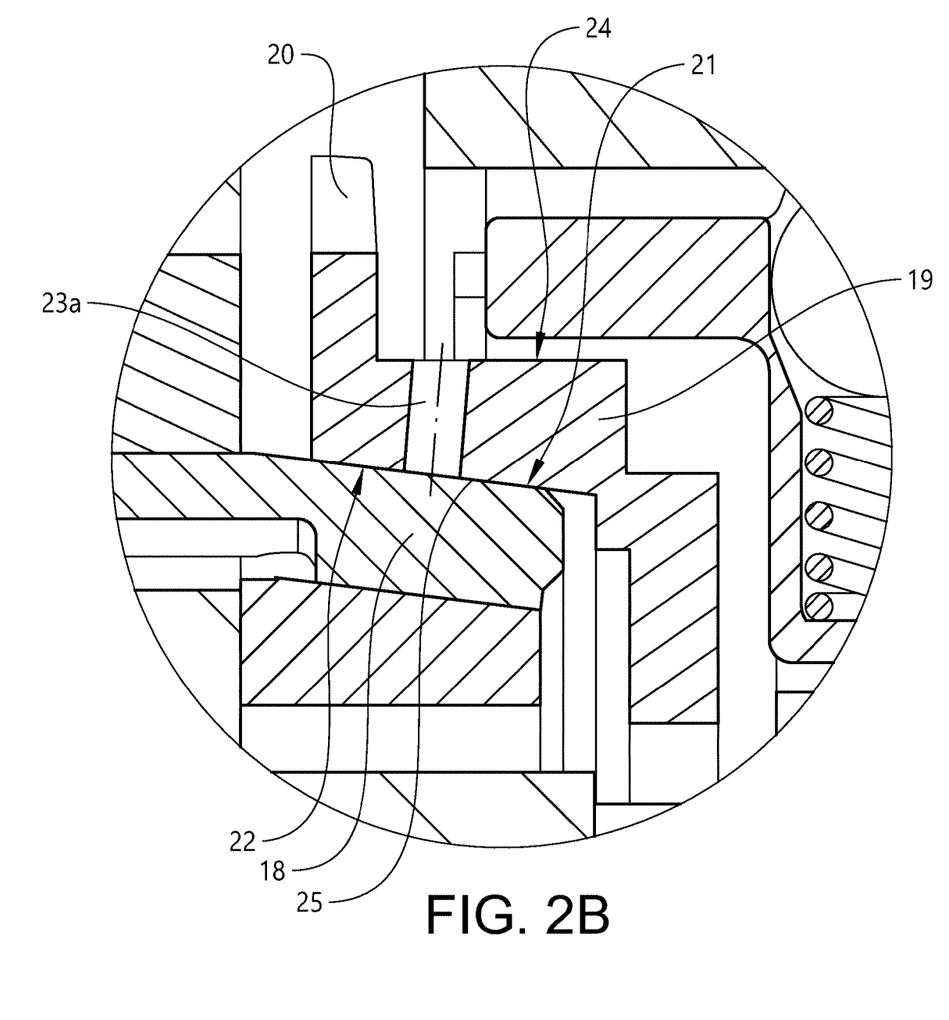
FIG. 2B is an enlarged view of double cone synchronizer rings of the synchronizer illustrated in FIG. 2A.

In FIG. 2B the first blocking ring is an example embodiment of a synchronizing ring 19 according to the invention. The first blocking ring, hereinafter called the first synchronizing ring 19, is designed to be arranged outside of and to abut against the intermediate ring, hereinafter called the first inner ring 18, for achieving friction between an outer surface 21 of the first inner ring 18 and an inner surface 22 of the first synchronizing ring 19 during synchronization. The first synchronizing ring 19 has a plurality of through holes 23a extending from the inner surface 22 to an outer surface 24 of the first synchronizing ring 19 for evacuation of oil from the interface 25 between the first inner ring 18 and the first synchronizing ring 19. One of these through holes 23a is shown FIG. 2B.

As regards the synchronization of the second idle gear wheel 8b, the synchronizer 9 has a single cone design. The synchronizer comprises the inner clutch cone ring 15 and a second blocking ring 26. These rings are further illustrated in an enlarged view in FIG. 2C.

As said before, a blocking ring has teeth for blocking a sliding movement of a synchronizer sleeve arranged externally of the blocking ring. In FIG. 2A, movement of the sleeve 10 is blocked by the second blocking ring 26 when the sleeve 10 is displaced towards the second idle gear wheel 8b. The sleeve 10 is blocked by roof-to-roof contact between the teeth 11 of the sleeve 10 and teeth 27 of the second blocking ring 26 until the rotational speed is synchronized. Thereafter, the sleeve 10 can be further displaced for engagement with the second idle gear wheel 8b.

Figure 2C:
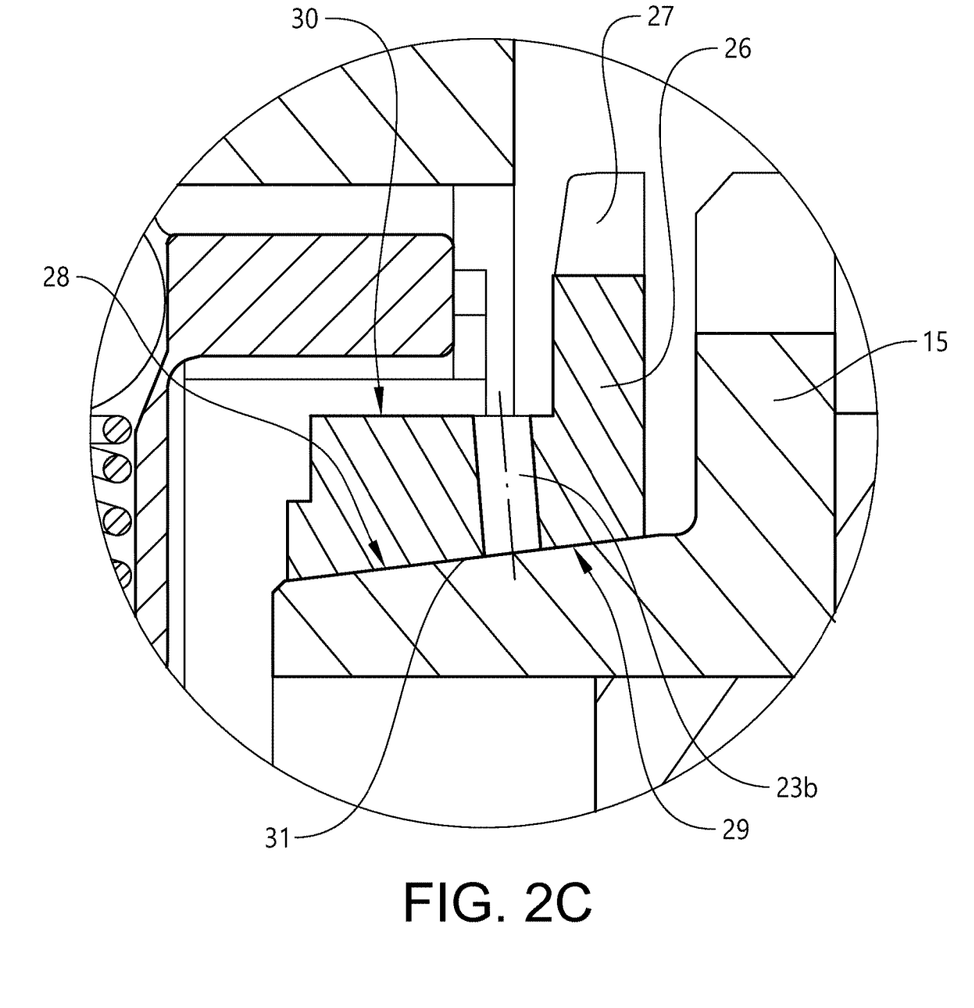
FIG. 2C is an enlarged view of single cone synchronizer rings of the synchronizer illustrated in FIG. 2A.

In FIG. 2C the second blocking ring is a further example embodiment of a synchronizing ring 26 according to the invention. The second blocking ring, hereinafter called the second synchronizing ring 26, is designed to be arranged outside of and to abut against the clutch cone ring, hereinafter called the second inner ring 15, for achieving friction between an outer surface 28 of the second inner ring 15 and an inner surface 29 of the second synchronizing ring 26 during synchronization. The second synchronizing ring 26 has a plurality of through holes 23b extending from the inner surface 29 to an outer surface 30 of the second synchronizing ring 26 for evacuation of oil from the interface 31 between the second inner ring 15 and the second synchronizing ring 26. One of these through holes 23b is shown FIG. 2C.

Figure 3:
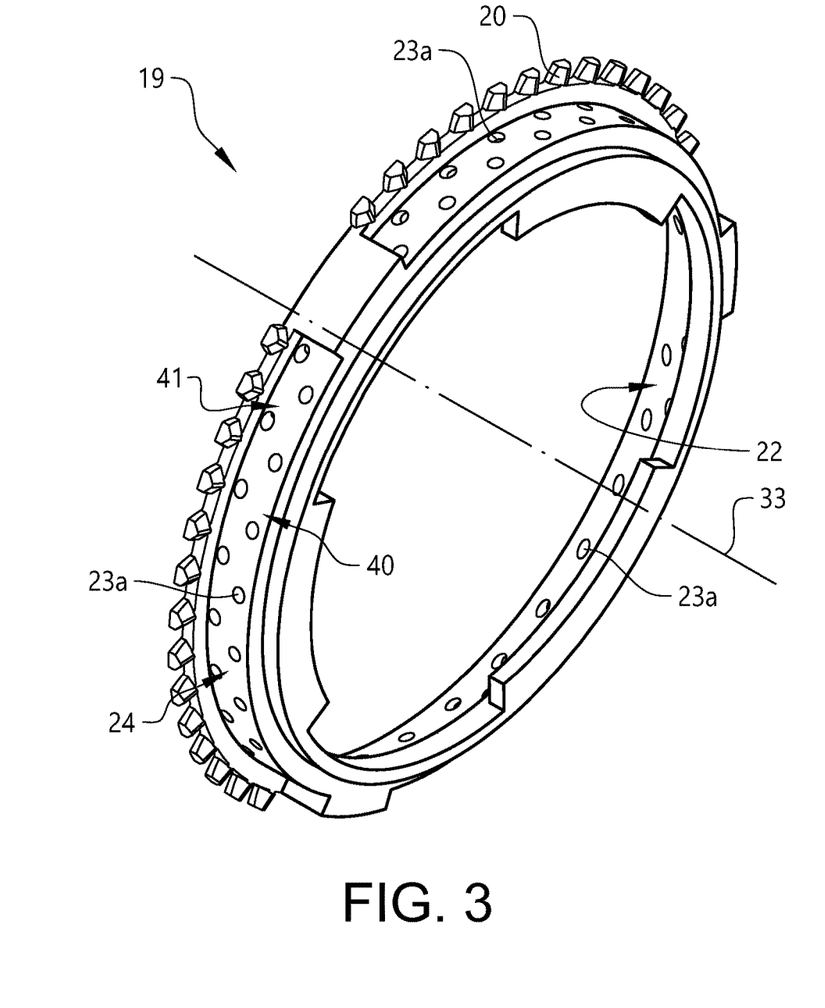
FIG. 3 is a perspective view of one embodiment of the synchronizing ring according to the invention.

FIG. 3 shows the first synchronizing ring 19 in a perspective view. The through holes 23a are distributed along the circumference of the synchronizing ring 19. In the example embodiment illustrated in FIG. 3, the synchronizing ring has a first row 40 of said plurality of through holes 23a arranged along the circumference of the synchronizing ring and a second row 41 of said plurality of through holes 23a arranged along the circumference of the synchronizing ring. The first row 40 and the second row 41 are arranged spaced apart from each other in a direction in parallel with a longitudinal axis 33 of the synchronizing ring. This direction is also called the longitudinal direction 33 of the synchronizing ring hereinafter. Further, said plurality of through holes 23a of the first row 40 and said plurality of through holes 23a of the second row 41 are arranged alternately along the circumference of the synchronizing ring 19. The blocking teeth 20 arranged at one end of the synchronizing ring are also illustrated.

Such a through hole is suitably drilled and has circular shape. Alternatively, any other suitably method for obtaining the through holes can be used. All through holes can have the same size or the size may vary between different through holes. The number of through holes is preferably in the interval 10-100, more preferably 15-60 and often 20-50. The size of each through hole is preferably within the range 0.5-6 mm in diameter, and often 2-4 mm in diameter. The number of through holes and the size of each through hole are suitably adapted to the size of the synchronizing ring.

The area of the inner surface 22 of the synchronizing ring covered by said plurality of through holes is suitably within the range 3-30%, and preferably 5-15%, of the total area of the inner surface 22 of the synchronizing ring 19. In other words; the total area of the through hole openings at the inner surface of the synchronizing ring can be within the range 3-30%, and preferably 5-15%, of the total area of the inner surface including both the through hole openings and the surface parts without through hole openings.

Figure 4A:
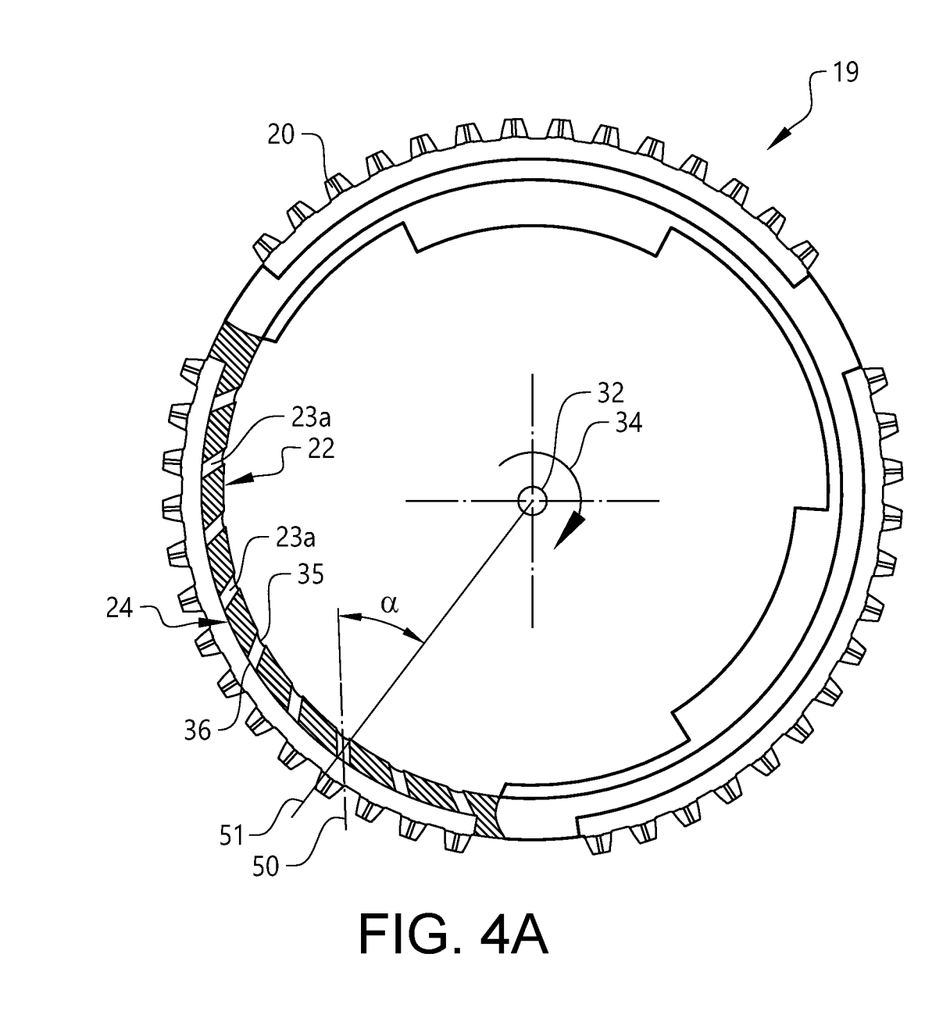
FIG. 4A is a partly cut plane view of the synchronizing ring in FIG. 3.
Figure 4B:
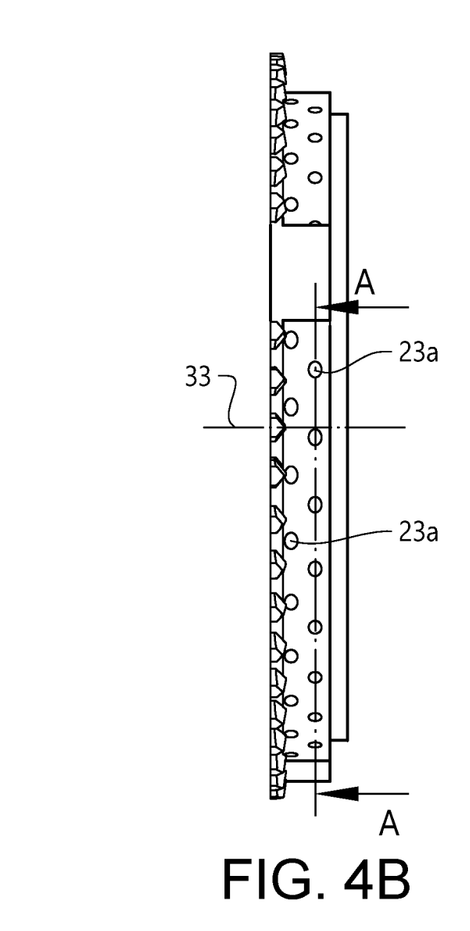
FIG. 4B is a side view of the synchronizing ring in FIG. 3.

FIG. 4A is a plane view of the synchronizing ring in FIG. 3 and FIG. 4B is a side view of the synchronizing ring. FIG. 4A is partly cut along A-A as also indicated in FIG. 4B to show some of the through holes 23a.

As can be seen from FIG. 4A, a longitudinal extension direction 50 of each of said plurality of through holes 23a preferably deviates with an angle $\alpha$, where $0<\alpha<90°$, from a radial direction 51 passing through the centre 32 of the synchronizing ring 19 when looked at the synchronizing ring in a direction in parallel with the longitudinal axis 33 of the synchronizing ring 19. The angle $\alpha$ is suitably in the range 5-45°, preferably in the range 10-40°, and more preferably in the range 15-35°. All through holes can have the same angle $\alpha$ or the angle may vary between different through holes.

The synchronizing ring 19 has an intended rotational direction 34 in operation. Looked at the synchronizing ring in the longitudinal direction 33 of the synchronizing ring 19, each of said plurality of through holes 23a suitably has the longitudinal extension direction 50 pivoted or inclined with the angle $\alpha$ in the opposite direction to the intended rotational direction 34 relative to the radial direction 51 passing through the centre 32 of the synchronizing ring 19. This means that when the synchronizing ring 19 rotates an oil inlet opening 35 of respective through hole 23a on the inner surface 22 of the synchronizing ring is leading and an oil outlet opening 36 of the respective through hole 23a on the outer surface 24 of the synchronizing ring is trailing.

Figure 5:
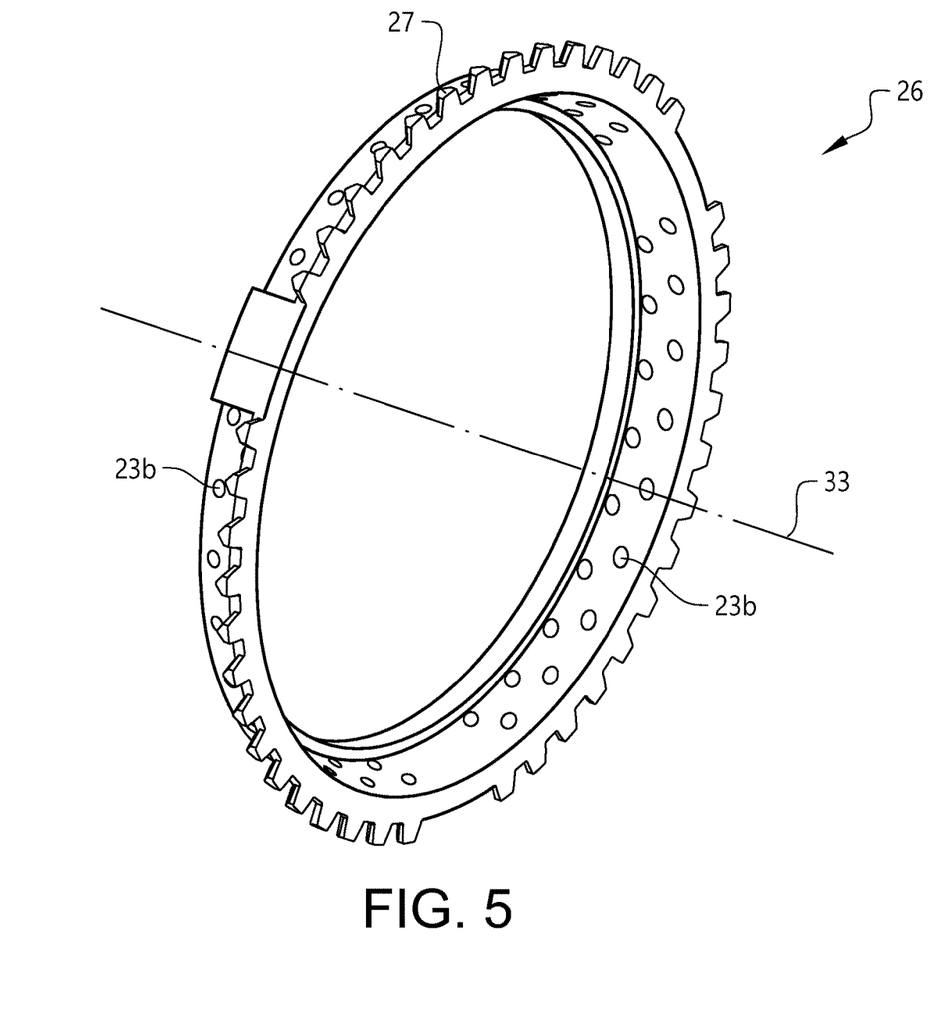
FIG. 5 is a perspective view of a further embodiment of the synchronizing ring according to the invention.
Figure 6A:
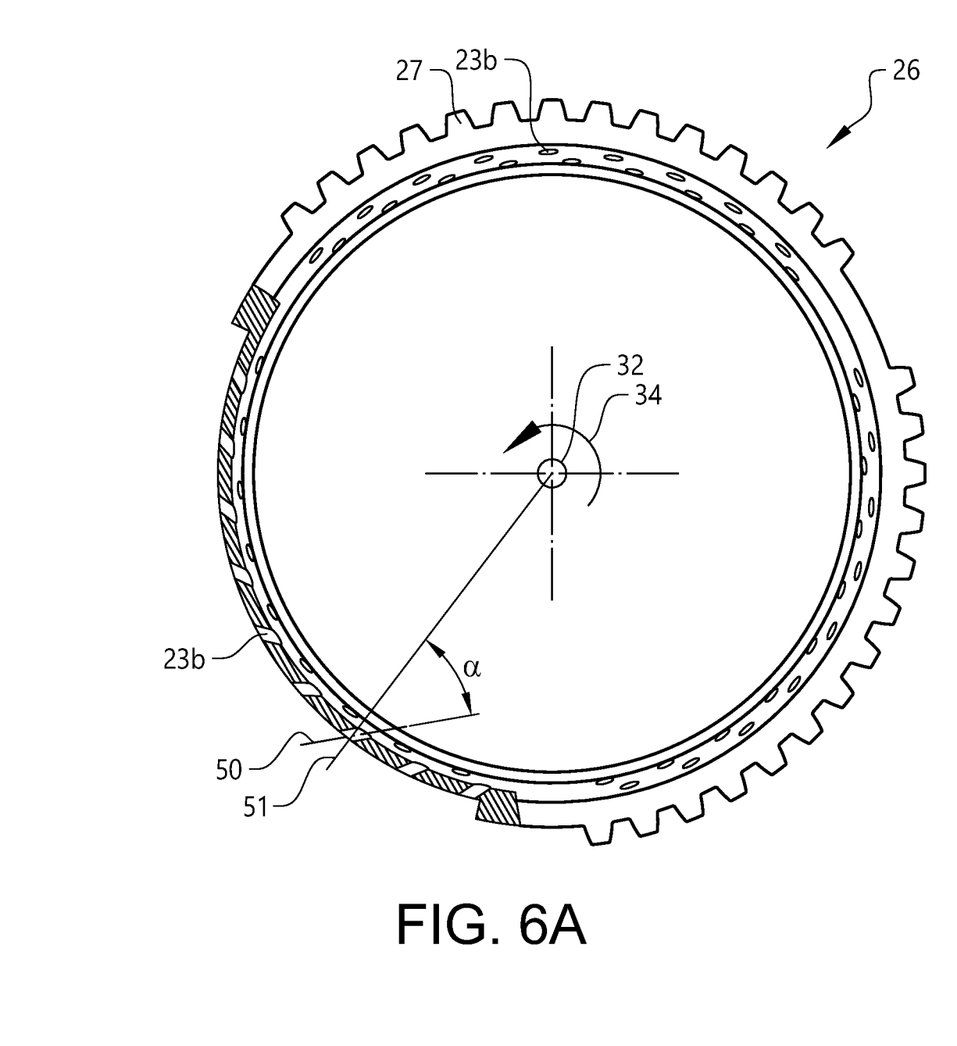
FIG. 6A is a partly cut plane view of the synchronizing ring in FIG. 5.
Figure 6B:
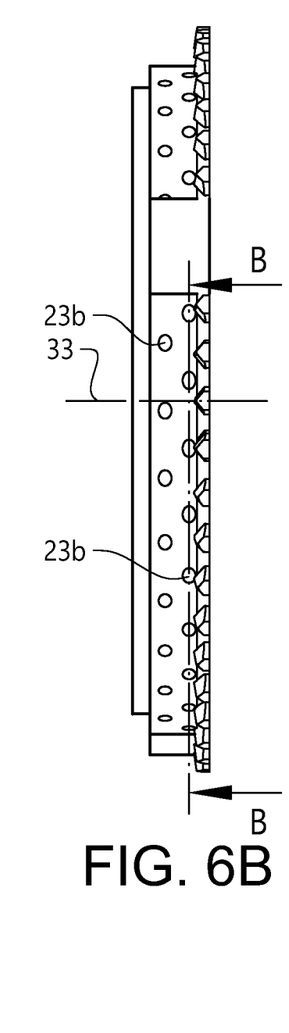
FIG. 6B is a side view of the synchronizing ring in FIG. 5.

FIG. 5 shows the second synchronizing ring 26 in a perspective view. FIGS. 6A and 6B show the synchronizing ring 26 in a partly cut plane view and a side view. This synchronizing ring is a blocking ring to be used together with the clutch cone ring 15 in the single cone design illustrated in FIG. 2C, whereas the first synchronizing ring 19 illustrated in FIGS. 3, 4A and 4B is a blocking ring to be used together with the intermediate ring 18 in the double cone design illustrated in FIG. 2B. Both the first synchronizing ring 19 and the second synchronizing ring 26 have so-called blocking teeth 20, 27 for interaction with the sleeve 10. As regards further details of the second synchronizing ring 26 illustrated in FIGS. 5, 6A and 6B, reference is made to the description hereinabove for the first synchronizing ring, since these features are similar to the both synchronizing rings.

The synchronizing ring 19, 26 may have a first intended rotational direction 34 and second intended rotational direction 34' in operation. This is further illustrated in FIGS. 7A and 8A for the first synchronizing ring 19. In this case, looked at the synchronizing ring in a direction in parallel with the longitudinal axis 33 of the synchronizing ring, the longitudinal extension direction 50 of each through hole of a first set 60 of said plurality of through holes 23a is preferably pivoted with the angle $\alpha$ in the opposite direction to the first intended rotational direction 34 relative to the radial direction 51 passing through the centre 32 of the synchronizing ring, and the longitudinal extension direction 50' of each through hole of a second set 61 of said plurality of through holes 23a' is preferably pivoted with the angle $\alpha$ in the opposite direction to the second intended rotational direction 34' relative to the radial direction 51' passing through the centre 32 of the synchronizing ring. In other words; the longitudinal extension direction of some of the through holes 23a can be adapted to the first intended rotational direction 34 and the longitudinal extension direction of other through holes 23a' can be adapted to a second opposite rotational direction 34'.

Figure 7A:
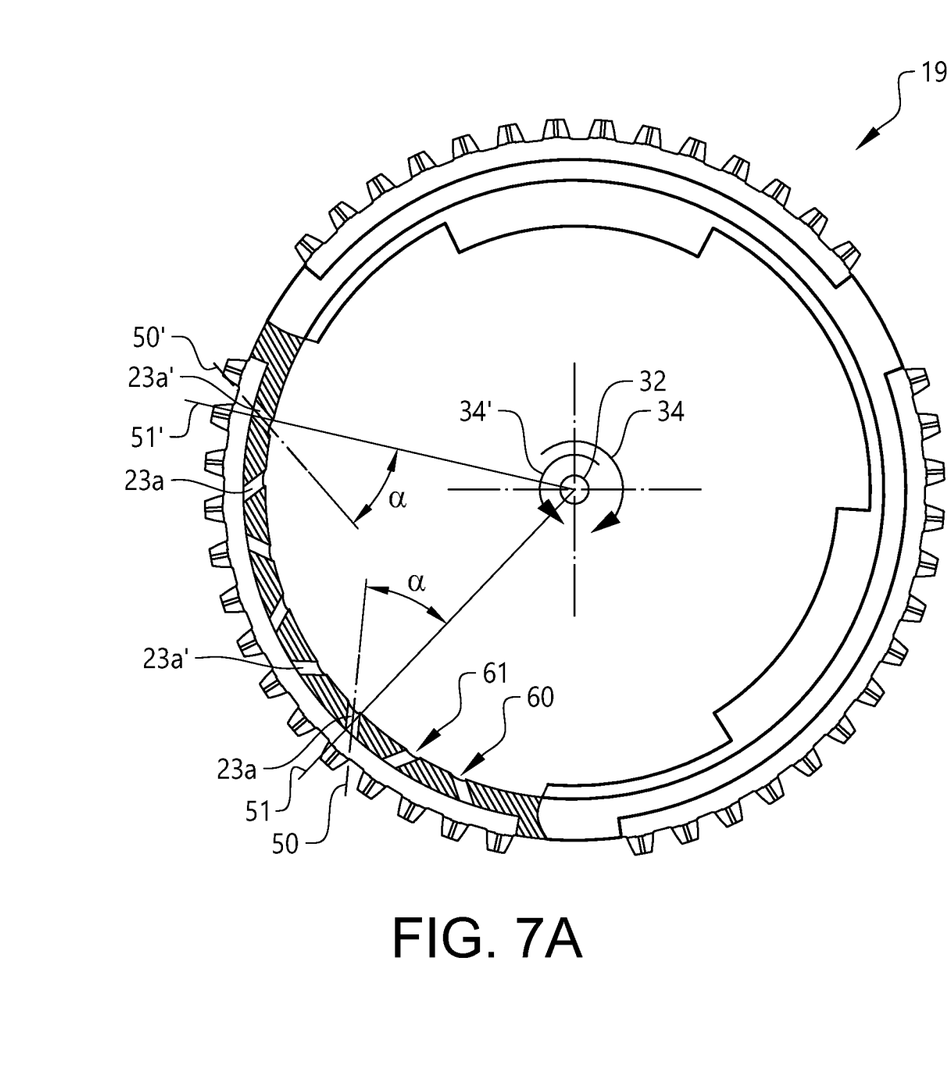
FIG. 7A is a partly cut plane view of a variant of the synchronizing ring in FIG. 3.
Figure 7B:
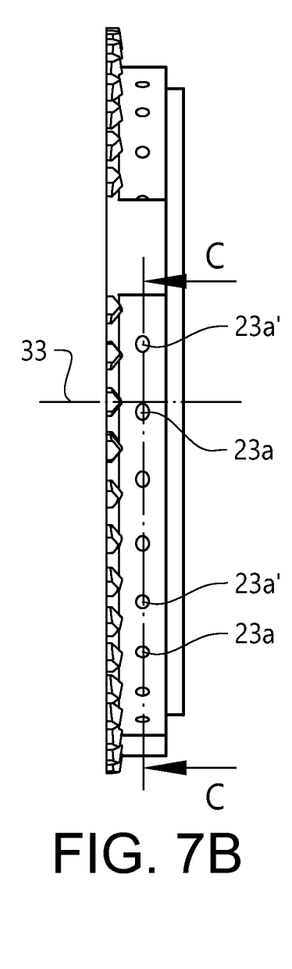
FIG. 7B is a side view of the synchronizing ring illustrated in FIG. 7A.

FIGS. 7A and 7B show a variant of the first synchronizing ring illustrated in FIG. 3. This synchronizing ring 19 has one row of through holes 23a, 23a'. The synchronizing ring 19 has a first set 60 of through holes adapted to the first rotational direction 34 and a second set 61 of through holes 23a' adapted to the second opposite rotational direction 34'. As illustrated, the longitudinal extension direction of each other through hole 23a can be adapted to the first rotational direction 34 and the longitudinal extension direction of each other through hole 23a' can be adapted to the second rotational direction 34'.

Figure 8A:
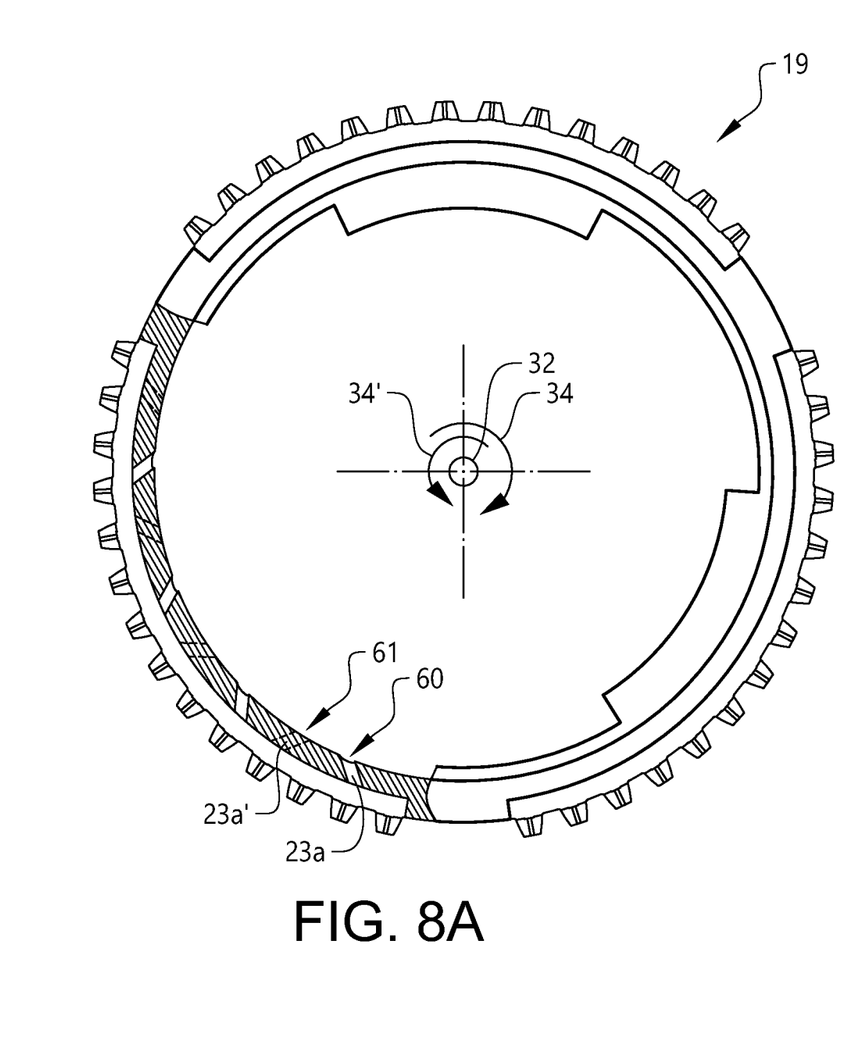
FIG. 8A is a partly cut plane view of a further variant of the synchronizing ring in FIG. 3.
Figure 8B:
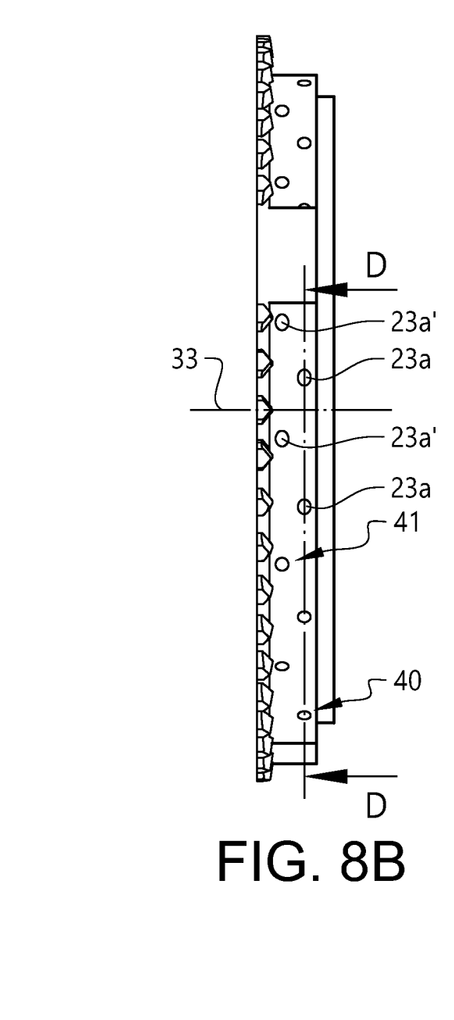
FIG. 8B is a side view of the synchronizing ring in FIG. 8A.

FIGS. 8A and 8B show a further variant of the first synchronizing ring illustrated in FIG. 3. This synchronizing ring 19 has two rows of through holes 23a, 23a'. The synchronizing ring 19 has a first set 60 of through holes 23a adapted to the first rotational direction 34 and a second set 61 of through holes 23a' adapted to the second opposite rotational direction 34'. The first set 60 can be arranged in a first row 40 along the circumference of the synchronizing ring 19 and the second set 61 can be arranged in a second row 41 along the circumference of the synchronizing ring 19. The first row 40 and the second row 41 are arranged spaced apart from each other in the longitudinal direction 33 of the synchronizing ring 19. As illustrated, the longitudinal extension direction of each through hole 23a of the first row 40 can be adapted to the first rotational direction 34 and the longitudinal extension direction of each through hole 23a' of the second row 41 can be adapted to the second rotational direction 34'.

Figure 9:
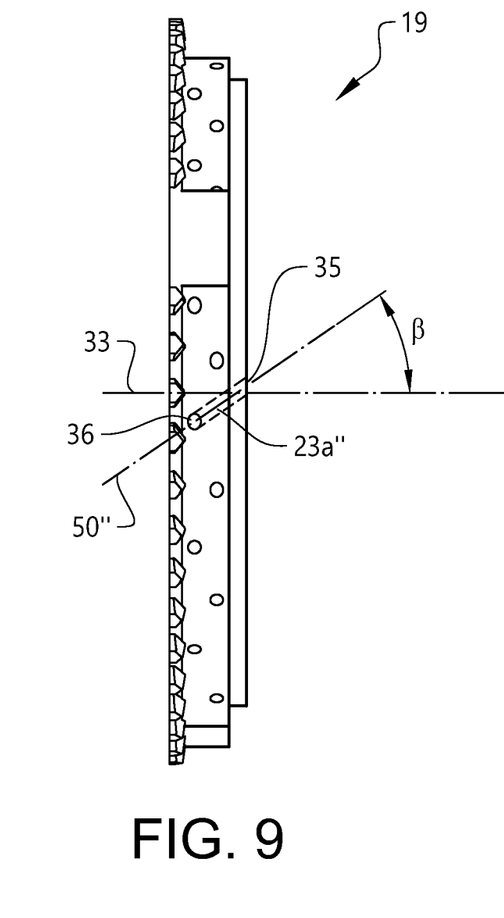
FIG. 9 is a side view of a further variant of the synchronizing ring in FIG. 3.

FIG. 9 shows a further variant of the synchronizing ring illustrated in FIG. 3. In addition to the angle α present between the longitudinal extension direction of the through hole and the radial direction passing the centre of the synchronizing ring, described for example embodiments of the first synchronizing ring and the second synchronizing ring hereinabove, as illustrated for one of the through holes 23a" in FIG. 9, the outlet opening 36 on the outer surface 24 and the inlet opening 35 on the inner surface 22 of the through hole 23a" can be displaced relative to each other in the longitudinal direction 33 of the synchronizing ring. (See also FIGS. 3 and 4A as regards the inner and outer surfaces 22, 24.) Thereby, the longitudinal extension direction 50" of the through hole 23a" forms an angle β, where 30<β<90°, relative to the longitudinal direction 33 of the synchronizing ring, when looked at the synchronizing ring in radial direction towards the centre 32. The angle β is preferably in the range 40-85°, and often 60-80°.

It is to be understood that the present invention is not limited to the embodiments described above and illustrated in the drawings; rather, the skilled person will recognize that many changes and modifications may be made within the scope of the appended claims. For example, the invention can be applied in a synchronizer having a triple cone design.

What is claimed is:

1. A synchronizer for a vehicle transmission, the synchronizer comprising:
    an inner ring; and
    a synchronizing ring being designed to be arranged outside of and to abut against the inner ring for achieving friction between an outer surface of the inner ring and an inner surface of the synchronizing ring during synchronization, the synchronizing ring having a plurality of through holes extending from the inner surface to an outer surface of the synchronizing ring for evacuation of oil from the interface between the inner ring and the synchronizing ring, wherein a longitudinal extension direction of each of said plurality of through holes deviates with an angle α from a radial direction passing through the centre of the synchronizing ring in a direction orthogonal with a longitudinal axis of the synchronizing ring.

2. A synchronizer according to claim 1, wherein the synchronizing ring is a blocking ring having teeth for blocking a sliding movement of a synchronizer sleeve arranged externally of the synchronizing ring.

3. A synchronizer according to claim 1, wherein the angle α is in the range 10-40°.

4. A synchronizer according to claim 1, wherein the angle α is in the range 15-35°.

5. A synchronizer according to claim 1, wherein the synchronizing ring has an intended rotational direction in operation, and when looked at the synchronizing ring in the direction in parallel with the longitudinal axis of the synchronizing ring, the longitudinal extension direction of each of said plurality of through holes is pivoted with the angle α in the opposite direction to the intended rotational direction relative to the radial direction passing through the centre of the synchronizing ring.

6. A synchronizer according to claim 1, the synchronizing ring has a first intended rotational direction and second intended rotational direction in operation, and when looked at the synchronizing ring in the direction in parallel with the longitudinal axis of the synchronizing ring, the longitudinal extension direction of each through hole of a first set of said plurality of through holes is pivoted with the angle α in the opposite direction to the first intended rotational direction relative to the radial direction passing through the centre of the synchronizing ring, and the longitudinal extension direction of each through hole of a second set of said plurality of through holes is pivoted with the angle α in the opposite direction to the second intended rotational direction relative to the radial direction passing through the centre of the synchronizing ring.

7. A synchronizer according to claim 1, wherein the synchronizing ring has a first row of said plurality of through holes arranged along the circumference of the synchronizing ring and a second row of said plurality of through holes arranged along the circumference of the synchronizing ring, the first row and the second row being arranged spaced apart from each other in the direction in parallel with a longitudinal axis of the synchronizing ring.

8. A synchronizer according to claim 7, wherein said plurality of through holes of the first row and said plurality of through holes of the second row being arranged alternately along the circumference of the synchronizing ring.

9. A synchronizer according to claim 1, wherein the area of the inner surface of the synchronizing ring covered by said plurality of through holes is within the range 3-30% of the total area of the inner surface of the synchronizing ring.

10. A synchronizer according to claim 1, wherein the area of the inner surface of the synchronizing ring covered by said plurality of through holes is within the range 5-15% of the total area of the inner surface of the synchronizing ring.

11. A synchronizer according to claim 1, wherein the size of each of said plurality of through holes is within 0.5-6 mm in diameter.

12. A synchronizer according to claim 1, wherein the size of each of said plurality of through holes is within 2-4 mm in diameter.

13. A synchronizer according to claim 1, wherein the angle α is in the range 5-45°.

14. A synchronizer for a vehicle transmission, the synchronizer comprising:
    an inner ring; and
    a synchronizing ring being arranged outside of and to abut against the inner ring for achieving friction between an outer surface of the inner ring and an inner surface of the synchronizing ring during synchronization, the synchronizing ring having a plurality of through holes extending from the inner surface to an outer surface of the synchronizing ring for evacuation of oil from the interface between the inner ring and the synchronizing ring, wherein a longitudinal extension direction of each of said plurality of through holes deviates with an angle α from a radial direction passing through the centre of the synchronizing ring in a direction orthogonal with a longitudinal axis of the synchronizing ring, and the angle α is in the range 5-45°.

15. A synchronizer according to claim 14, wherein the synchronizing ring has an intended rotational direction in operation, and when looked at the synchronizing ring in the direction in parallel with the longitudinal axis of the synchronizing ring, the longitudinal extension direction of each of said plurality of through holes is pivoted with the angle $\alpha$ in the opposite direction to the intended rotational direction relative to the radial direction passing through the centre of the synchronizing ring.

16. A synchronizer according to claim 14, wherein the synchronizer comprises a sleeve for connecting a shaft and a gear wheel journaled on the shaft to each other, the synchronizing ring being a blocking ring having teeth for blocking a sliding movement of the synchronizer sleeve arranged externally of the blocking ring.

17. A synchronizer according to claim 14, wherein the inner ring is a clutch cone ring.

18. A synchronizer according to claim 14, wherein the synchronizer comprises an internal ring and the inner ring is an intermediate ring arranged outside of the internal ring.

19. A synchronizer according to claim 14, wherein the angle $\alpha$ is in the range 10-40°.

20. A synchronizer according to claim 14, wherein the angle $\alpha$ is in the range 15-35°.

* * * * *